March 11, 1958     R. F. SHOUP     2,826,365
VOTING MACHINE KEY AND CURTAIN INTERLOCK Filed March 12, 1956     8 Sheets-Sheet 1

INVENTOR.
RANSOM F. SHOUP
BY
ATTORNEY

March 11, 1958 R. F. SHOUP 2,826,365
VOTING MACHINE KEY AND CURTAIN INTERLOCK
Filed March 12, 1956 8 Sheets-Sheet 2

INVENTOR.
RANSOM F. SHOUP
BY
ATTORNEY

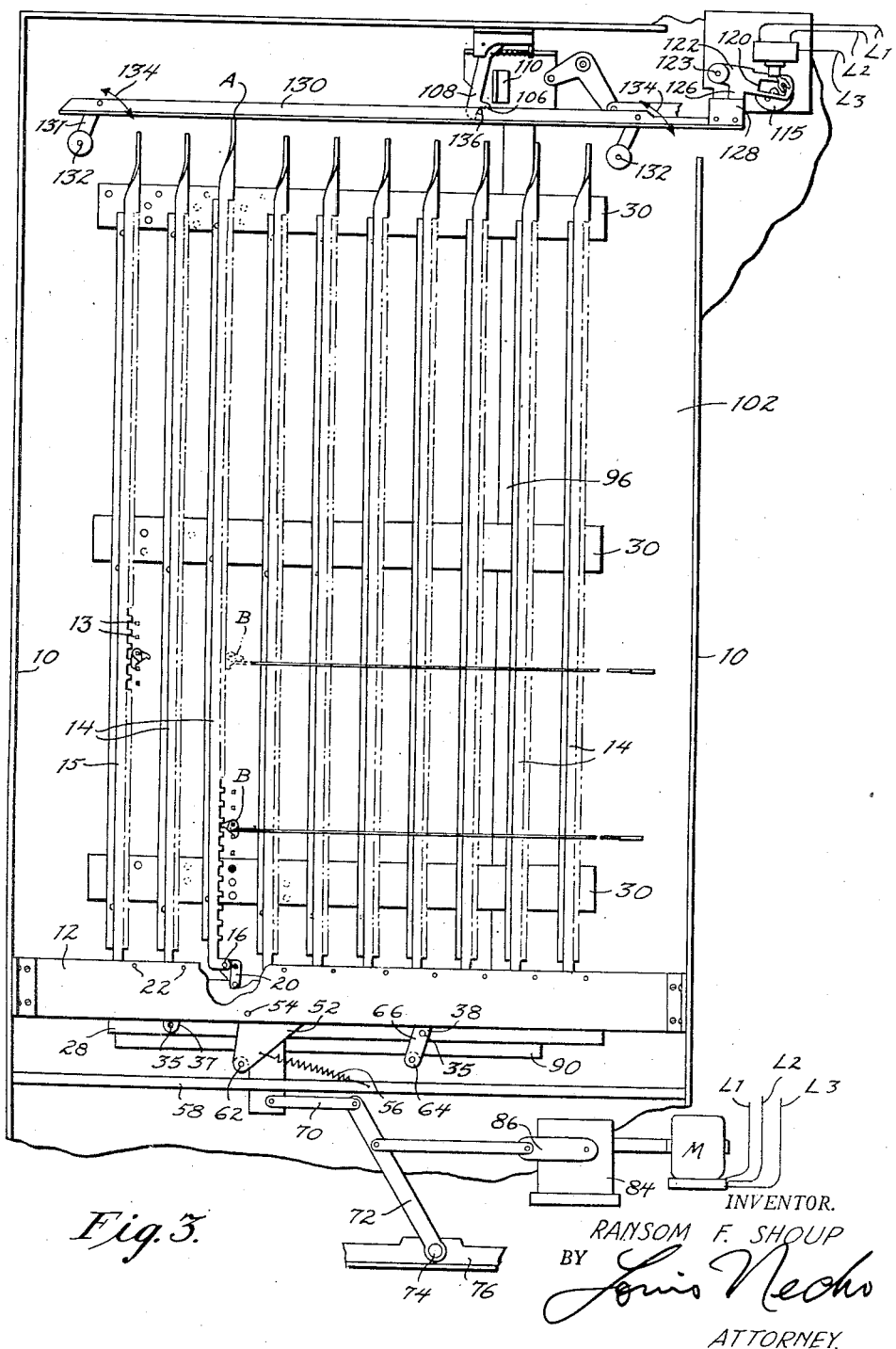

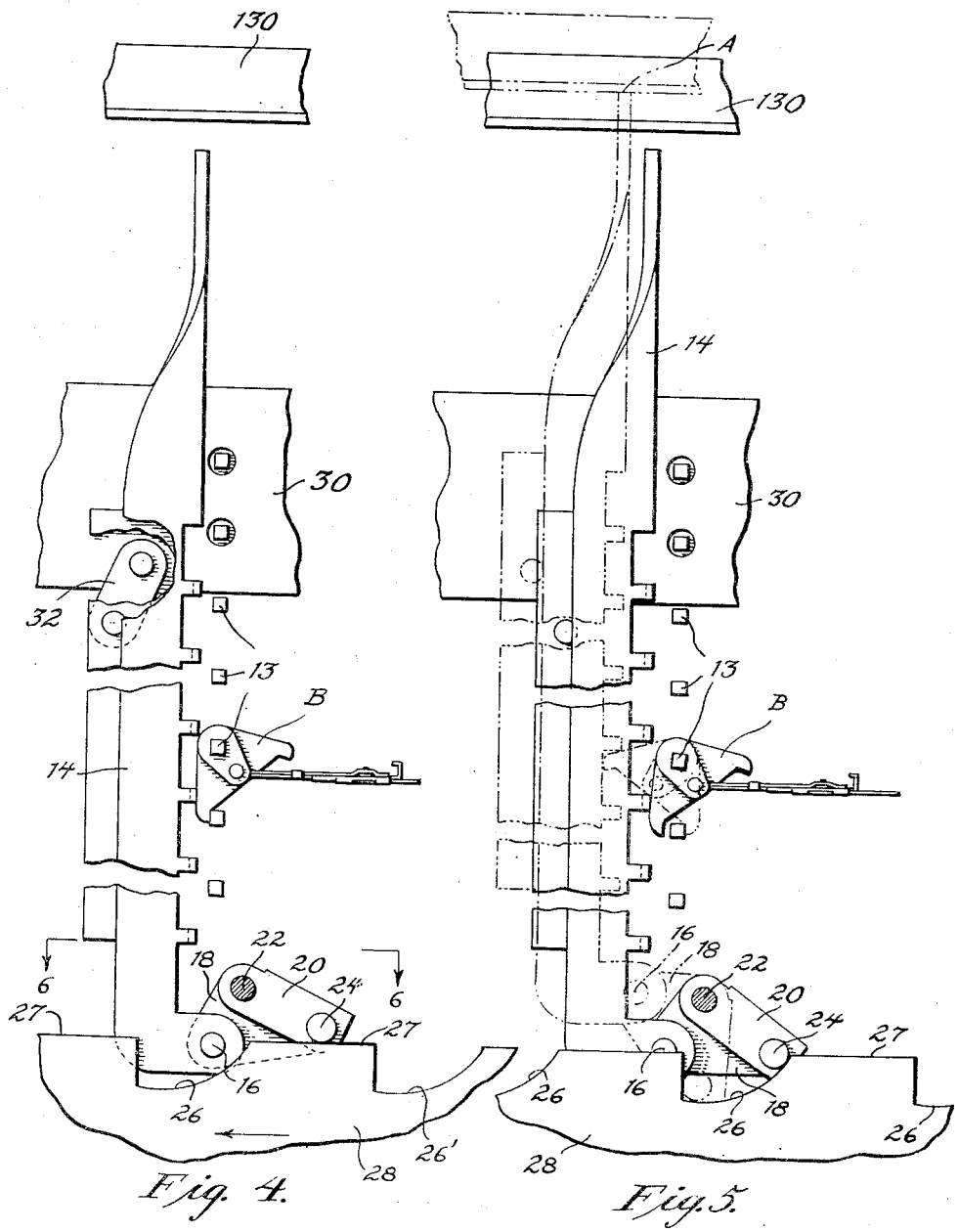

March 11, 1958   R. F. SHOUP   2,826,365
VOTING MACHINE KEY AND CURTAIN INTERLOCK
Filed March 12, 1956   8 Sheets-Sheet 5
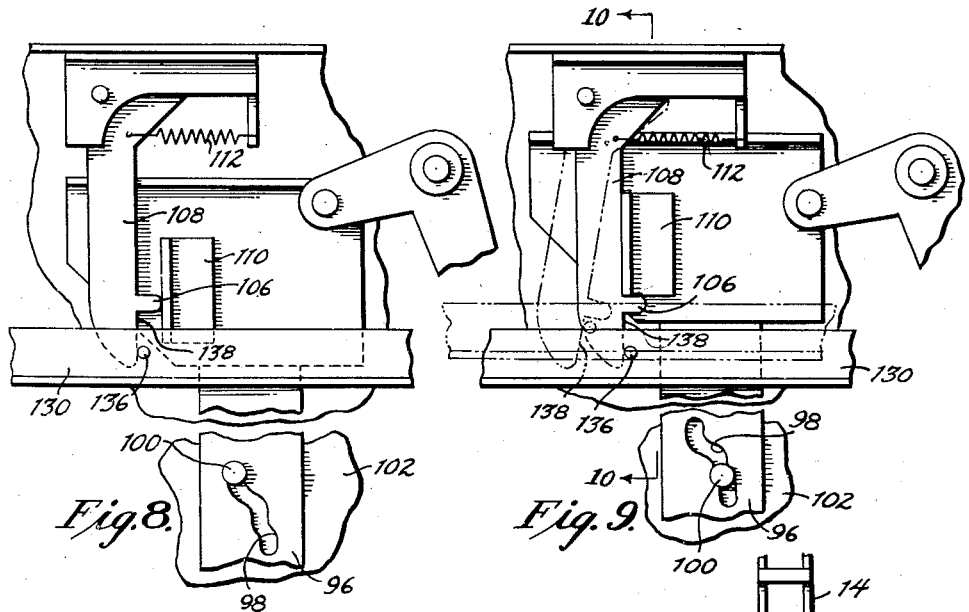
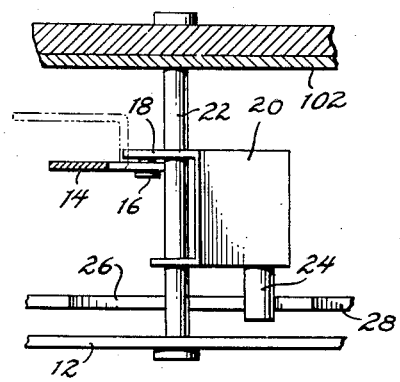
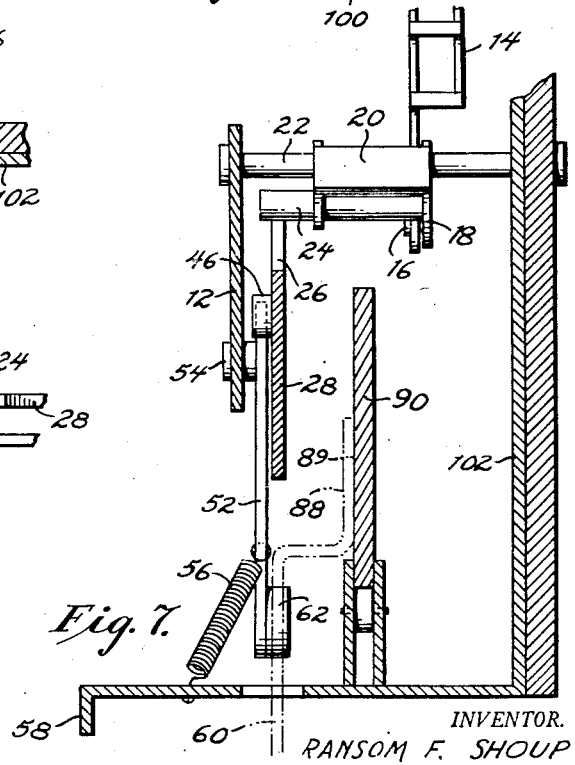
INVENTOR.
RANSOM F. SHOUP
BY
ATTORNEY.

March 11, 1958  R. F. SHOUP  2,826,365
VOTING MACHINE KEY AND CURTAIN INTERLOCK
Filed March 12, 1956  8 Sheets-Sheet 6

INVENTOR.
RANSOM F. SHOUP
BY Louis Necho
ATTORNEY.

March 11, 1958  R. F. SHOUP  2,826,365
VOTING MACHINE KEY AND CURTAIN INTERLOCK
Filed March 12, 1956  8 Sheets-Sheet 7
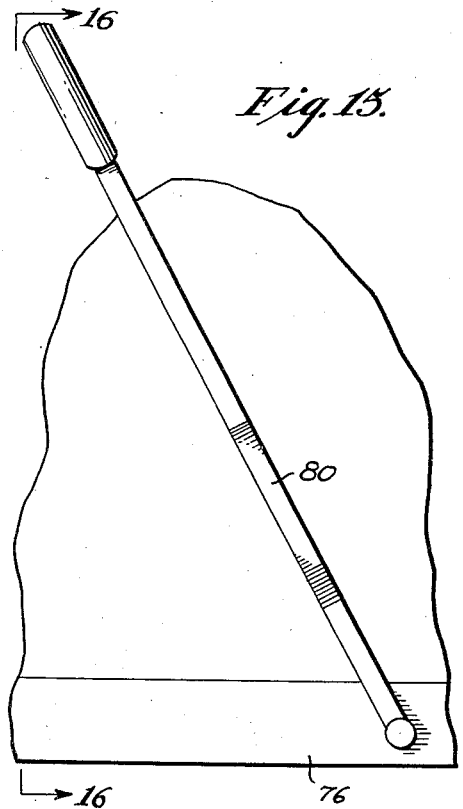
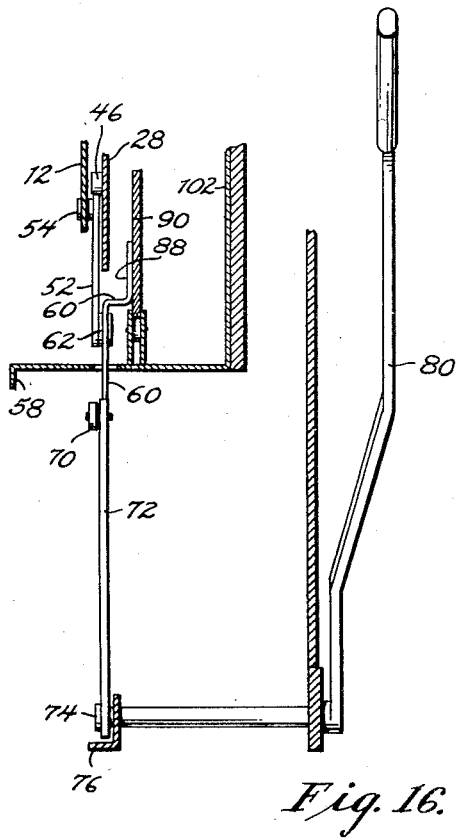
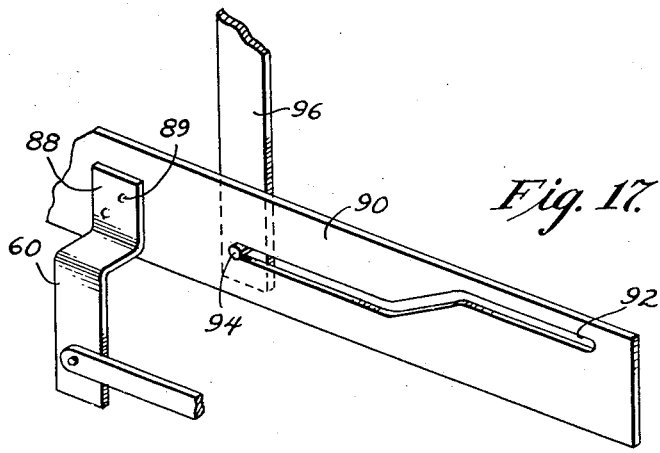
INVENTOR.
RANSOM F. SHOUP
BY
ATTORNEY.

March 11, 1958  R. F. SHOUP  2,826,365
VOTING MACHINE KEY AND CURTAIN INTERLOCK
Filed March 12, 1956  8 Sheets-Sheet 8
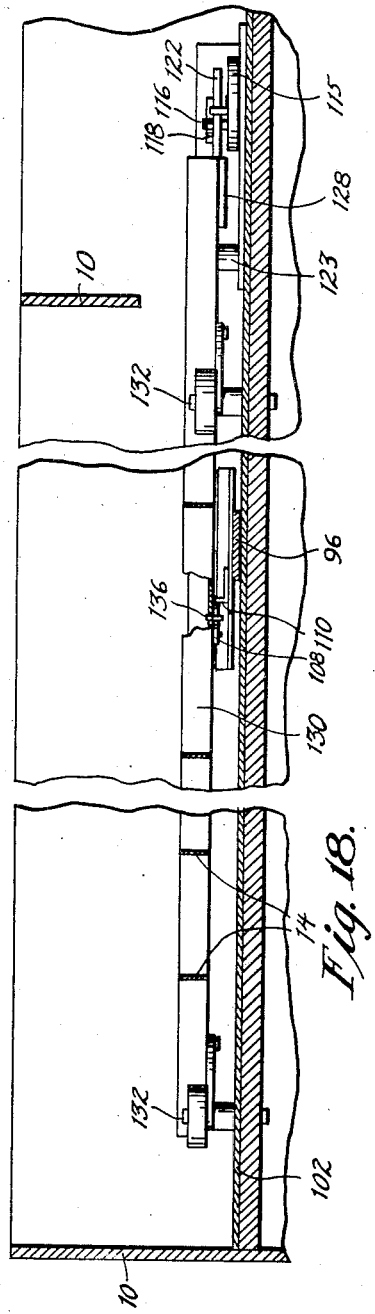
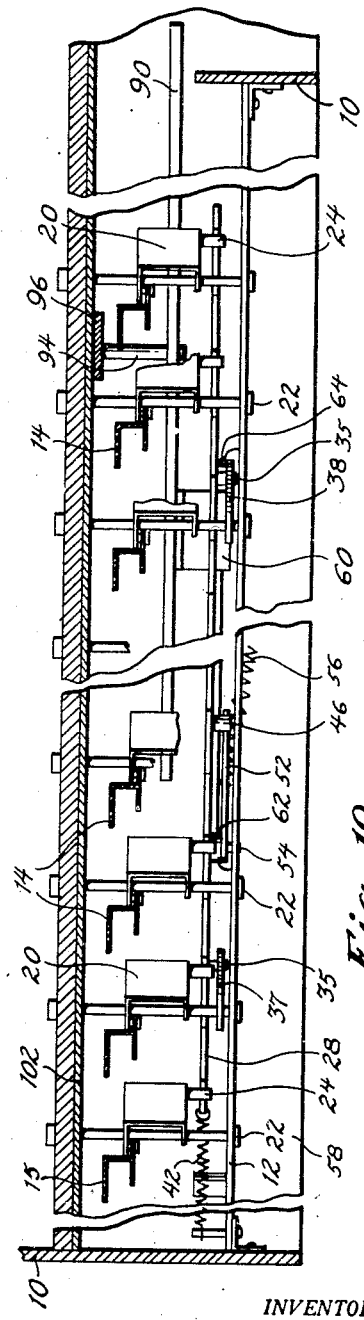
INVENTOR.
RANSOM F. SHOUP
BY
ATTORNEY.

ced Mar. 11, 1958

United States Patent Office 2,826,365
Patented Mar. 11, 1958

2,826,365

VOTING MACHINE KEY AND CURTAIN INTERLOCK

Ransom F. Shoup, Bryn Mawr, Pa., assignor to The Shoup Voting Machine Corporation, New York, N. Y., a corporation of New York Application March 12, 1956, Serial No. 570,940

16 Claims. (Cl. 235—130)

My invention relates to a voting machine of the general type disclosed in Patent No. 2,054,102, Patent No. 2,251,254, Patent No. 2,520,740, and other Shoup patents.

In voting machines of the type referred to, and in other types of voting machines available heretofore, a voter can enter a voting booth or machine and close the curtain and, by turning a voting key to vote-casting position, the voter can open the curtain and walk out even though, before opening the curtain, the voter may have turned the voting key back to its non-vote-casting position. In other words, a voter can, unwittingly, lose his vote.

It is therefore one object of the invention to produce an improved voting machine in which the curtain cannot be moved to open position unless the voter places at least one voting key in vote-casting position, and leaves said key in its vote-casting position.

Voting machines of the type referred to include a number of counters arranged in a number of columns for registering votes in intraparty and interparty elections of regular candidates and an auxiliary column of counters for registering votes on a special candidate or special question such as approval or disapproval of a loan, or of constitutional amendment, or some other plebiscite. In such machines, a suitable release mechanism was carried, or actuated, by the main interlock and served to release the curtain operating mechanism to permit opening of the curtain once any of the voting keys in the regular candidate vote registering columns has been moved to vote-casting position. But the auxiliary column devoted to special candidates or questions was not operatively connected to the main interlock and, therefore, anyone who only voted on a special candidate or question but did not vote on any of the regular candidates in the regular interparty or intraparty vote registering columns, could not open the curtain.

Different voting districts have different requirements and, therefore, it often becomes necessary to disconnect the pull strap of voting keys in the regular vote registering columns from the main interlock and to connect them to a supplemental interlock to enable the voter to cast a yes, or no, or other special vote. In a case such as this, if the voter only turned keys, the pull straps of which were disconnected from the main interlock, the voter could not open the curtain.

It is therefore a further object of the invention to produce an improved voting machine in which the movement of any voting key in any of the regular columns, or in the special column, to vote-casting position will enable the voter to open the curtain regardless of whether the corresponding pull strap is, or is not connected to the main interlock.

In prior voting machines, an integral handle return frame or voting key re-setting, or restoring frame was used. This meant that, when one voting key is turned, the whole return frame, which is formed of ten bars, more or less, was raised. The weight and the friction involved made turning the voting key difficult even though very strong counterbalancing springs were provided. Furthermore, raising the entire frame when only one or two votes were to be cast in one or two columns, represents wasted motion and energy.

It is therefore a still further object of the invention to provide a separate, individually movable handle return member for each of the regular and special vote registering columns whereby only the handle return member which is engaged by a voting key in the corresponding column will be raised when said voting key is moved to vote-casting position.

A still further object of the invention is to provide an improved machine in which no voting key can be moved to vote-casting position unless the curtain has first been closed.

A still further object is to incorporate the improvements referred to, in the type of machine referred to, at minimum expense and with minimum alteration of the structure of the machine proper.

These and other objects are attained by my invention as set forth in the following specification and as shown in the accompanying drawings in which:

Fig. 3 is similar to Fig. 2, but showing the parts in the position they assume after a voting key has been moved to vote-casting position and it is possible to open the curtain.

Fig. 4 is an enlargement of a portion of Fig. 1 showing details of construction.

Fig. 5 is a similar enlargement and in solid lines, it shows the parts as they appear in the position of Fig. 2 and, in phantom lines, it shows the parts as they appear in the position of Fig. 3.

Fig. 6 is an enlarged, fragmentary, sectional view looking in the direction of line 6—6 on Fig. 4.

Fig. 7 is a similar view looking in the direction of line 7—7 on Fig. 1.

Fig. 8 is an enlargement of some of the switch controlling parts as shown at the top of Fig. 1.

Fig. 9 is similar to Fig. 8 and, in solid lines, it shows the same parts as they appear in Fig. 2, and, in phantom lines, it shows the same parts as they appear in Fig. 3.

Fig. 15 is a fragmentary elevational view showing manual, instead of motor operation of certain parts of the switch locking and releasing mechanism.

Fig. 16 is a sectional view looking in the direction of line 16—16 on Fig. 15.

Fig. 17 is an enlargement showing details which are not readily seen at the bottom of Figs. 1, 2 and 3.

Fig. 18 is a view looking in the direction of line 18—18 on Fig. 1.

Fig. 19 is a view looking in the direction of line 19—19 on Fig. 1.

Figure 1:
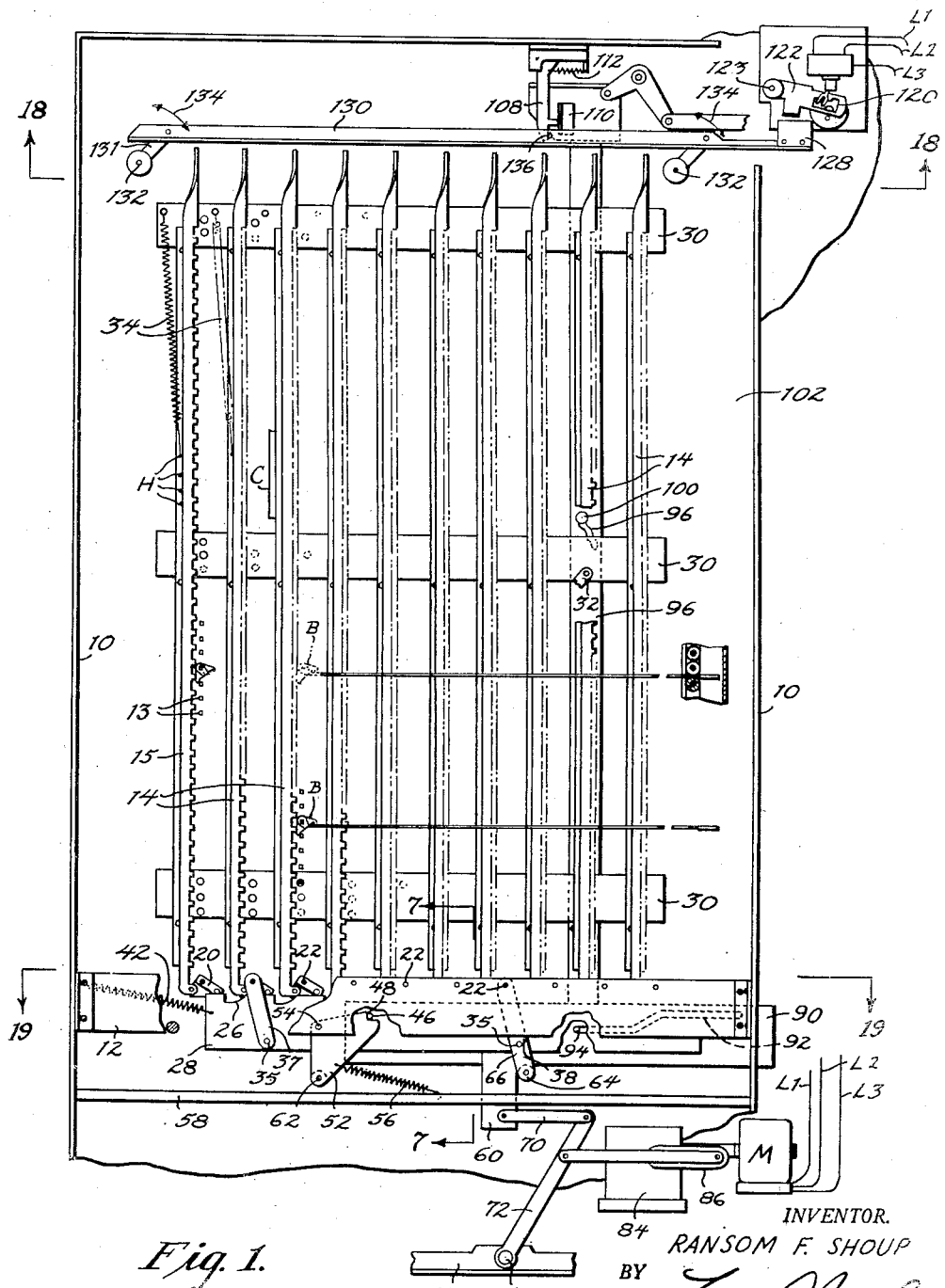
Fig. 1 is a highly fragmentary and, diagrammatic elevational view looking at the back of the machine and showing the parts in the position they assume when the curtain is open, only the portion of one of the vote registering columns and only the barest essentials of the machine being shown.

Referring to Fig. 1 of the drawings, 10 and 12 designate rigid frame members to which some of the parts to be described are secured; 14 designates regular, individual, vertically movable handle return members each of which is associated with one of the regular candidate vote registering columns, or counters, and 15 designates a special, vertically movable, handle return member which is associated with a special question, or special candidate, vote registering column or counter. Because the vote registering columns referred to form no part of the present invention and are fully described in prior Shoup patents, and in order better to show the parts of the present invention, only a portion of one of said columns is shown at C. It is sufficient for the purpose of this case to point out that members 14 and 15 are adapted to be engaged by butterflies B, which are mounted on the rear ends of square shafts 13, so that, when the voting keys, which are not shown, but which are mounted on the front ends of square shafts 13, are rotated to vote casting position, the corresponding handle return members 14 or 15 are raised from the solid line position of Fig. 4 to the broken line position of Fig. 5 in the manner and for the purpose hereinafter set forth. Conversely, when handle return members 14, or 15 move back to their lower position, they rotate square shafts 13 and the voting keys carried thereby in the reverse direction to re-set or restore, the voting keys, and the vote registering columns associated therewith, to their original position from which they may again be moved to their vote casting by a subsequent voter.

As can best be seen from Figs. 1, 4 and 6, each handle return member is pivoted, at 16, to an ear 18 of a bracket 20 which is rotatable on a pin 22 which is rigidly carried by the fixed frame members of the machine. Each bracket 20 carries a follower 24 which, in the upper position of the handle return member, moves down into a notch 26 on movable cam bar 28 and which, in the lower position of the handle return member, rides on an adjacent flat 27 on said movable cam bar 28. As shown in solid lines in Fig. 5, as shown in Fig. 4, the handle return member is just beginning its upward movement and the follower 24 of this member is just beginning to move down into notch 26. In order to facilitate movement of the followers 24, the flats 27 slant slightly from right to left as viewed in Fig. 1, but because this slant is very small and cannot be shown without extreme exaggeration, it has not been shown at all. Each handle return member is further pivotably secured to upper horizontal frame members 30 by means of links 32 and is counter-balanced by a spring 34 to facilitate raising of handle return member by the rotation of any voting key. The tension of each spring 34 may be adjusted by engaging the lower end of the spring with one or another of vertically spaced holes H which are shown in Fig. 1 only.

Movable cam bar 28 is pivoted, at 35, to the lower ends of links 37 and 38, the upper ends of which are pivoted on pins 22. Cam bar 28 is constantly pulled to the left, as viewed in Figs. 1, 2 and 3 by means of a spring 42, but is locked against movement in response to the action of this spring by means of pin 46 which, in the open position of the curtain, as shown in Fig. 1, abuts surface 48 of a plate 52 which is pivoted, at 54, to frame member 12 and which is constantly biased in counterclockwise direction by spring 56 which is anchored to a lower fixed frame member 58. Movable cam bar 28 is released for movement to the left in response to the action of spring 42 only when arm 60 engages pin 62 on plate 52 and rotates plate 52 in clockwise direction and disengages pin 46 from surface 48. Conversely, movable cam bar 28 is moved to the right, as viewed in Figs. 1, 2 and 3, by engagement of arm 60 with roller 64 which is carried by a bottom extension 66 of link 38.

Arm 60 which actuates movable cam bar 28 is carried by one end of link 70, the other end of which is pivoted to the upper end of a lever 72. The lower end of lever 72 is pivoted at 74, to a lower fixed frame member 76.

Lever 72 may be moved, in either direction, by moving lever 80, of Figs. 15 and 16, or by means of reversible motor M through gear box 84 and linkage 86.

Arm 60 includes an off-set portion 88 which is secured at 89 to a second cam bar 90, whereby cam bar 90 will move jointly with cam bar 28. Cam bar 90 is provided with a cam slot 92 which is formed of a high portion and a low portion and which is permanently engaged by a pin 94 which projects from the lower end of a vertically movable locking and unlocking bar 96. Locking and unlocking bar 96 is provided with a vertical cam slot 98 which is permanently engaged by a roller 100 which projects from the back wall 102 of the machine. By this means, bar 96 is moved laterally in one direction as it is raised and is moved laterally in the opposite direction as it is lowered. The structure and operation of bar 96 are shown in Shoup Patent No. 2,251,254 and Shoup Patent No. 2,329,005 and are therefore not shown nor described in detail. It is sufficient, for the purpose of this case, to point out that, when pin 94 rides in the high portion of slot 92, bar 96 is raised to permit lug 106, on pivotally mounted pendant arm 108, to engage the bottom of angle 110 which is carried by the upper end of bar 96. It will be noted that arm 108 is constantly biased by spring 112, in a direction to cause lug 106 to engage angle 110. It will be seen from Fig. 2 that, as long as lug 106 engages the bottom of angle 110, bar 96 cannot move downwardly and, therefore, cam bar 90 can move to the right only as long as pin 94 is in the upper, straight portion of slot 92. This means that arm 60 cannot be moved back to the position of Fig. 1 and therefore the curtain cannot be opened. It is to be noted that the lengths of the cam bars, the lengths of their travel and the length of slot 92, and of its upper and lower portions, are not shown to scale.

The motor M is energized in a direction to close or to open the curtain by an electric switch which is connected to the motor by lines L–1, L–2 and L–3. The switch itself is of the type disclosed in Shoup Patent No. 2,296,120 and is therefore not shown nor described in detail. It is sufficient to point out that, in the present construction, shaft 114, which actuates the switch, carries a disc 115 from which pin 116 projects. Pin 116 is permanently engaged by a freely reciprocable yoke 118 and projects into an opening 120 which is formed in a locking plate 122 which is pivotally mounted at 123 so as to swing freely about said pivot. The wall defining opening 120 includes a linear wall 124 which in the lower position of plate 122 engages pin 116 to prevent rotation of disc 115 and switch shaft 114. Locking plate 122 is provided with a foot 126 which is adapted to be engaged by finger 128 at the corresponding end of a horizontal bar 130 so that, which bar 130 is raised, it raises plate 122 and disengages pin 116 from wall 124 to permit rotation of disc 115 and hence actuation of the switch.

Bar 130 is carried by links 131 which are pivoted at 132 to permit bar 130 to swing in the direction of arrow 134. When a handle return member 14 or 15 is raised, it raises bar 130 to the position of Fig. 3 in which finger 128 engages foot 126 and raises locking plate 122 until wall 124 clears pin 116 to permit rotation of disc 115 and shaft 114 of the switch. Raising bar 130 to the position of Fig. 3 also causes pin 136, which projects forwardly from bar 130, to engage the face 138 of the lower end of pendant arm 108 and move the latter to the left, as viewed in Figs. 1, 2 and 3 or to the position shown in phantom lines in Fig. 9. This movement of pendant arm 108 disengages roller 106 from angle 110 and permits downward movement of locking bar 96 to permit movement of cam bars 28 and 90 to the curtain open position, or to the right in Fig. 1. Cam bars 28 and 90 may be moved manually or by motor M.

Figure 2:
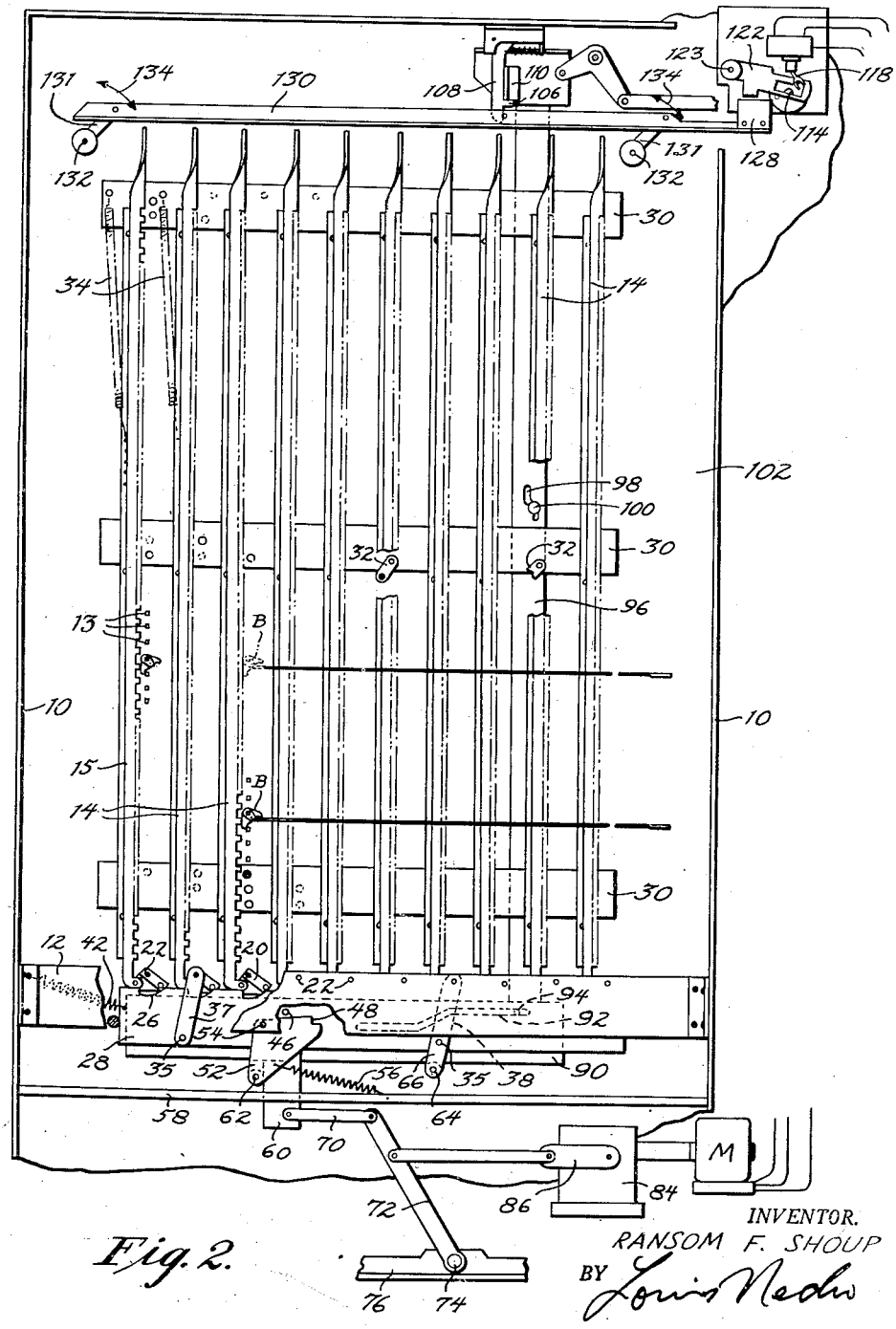
Fig. 2 is similar to Fig. 1, but showing the parts in the position they assume when the curtain is closed, but before any voting key is moved to vote-casting position.
Figure 10:
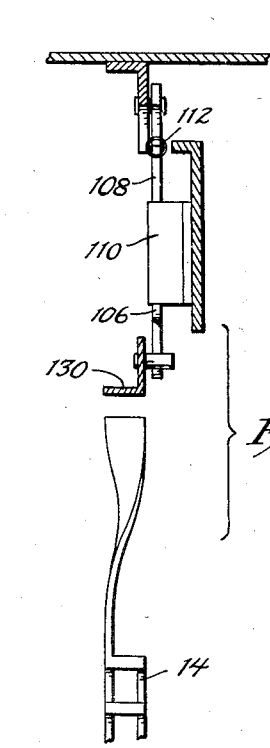
Fig. 10 is a sectional view looking in the direction of line 10—10 on Fig. 9.

In Figs. 1 and 2, bar 130 is shown in its lowermost position in which it is not engaged by the handle return members when said members are also in their lower positions. Bar 130 is supported in its lowermost position by any suitable means, not shown.

Figure 11:
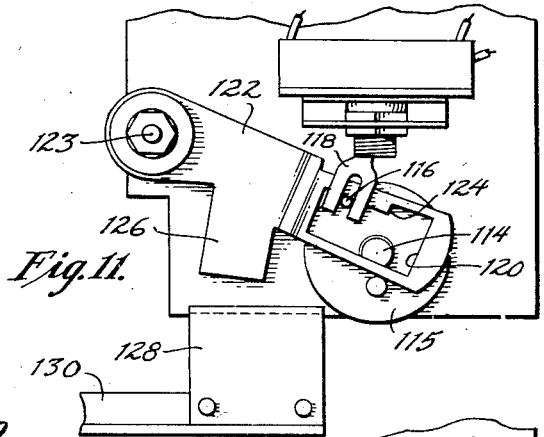
Fig. 11 is an enlargement of the switch as it appears at the upper right hand portion of Fig. 1.
Figure 12:
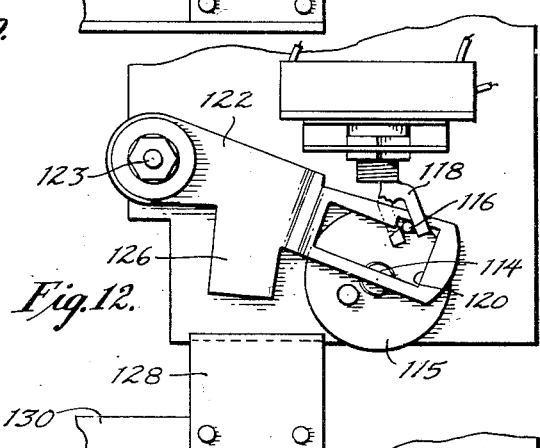
Fig. 12 is similar to Fig. 11, but shows the same parts as they appear in the position of Fig. 2.
Figure 14:
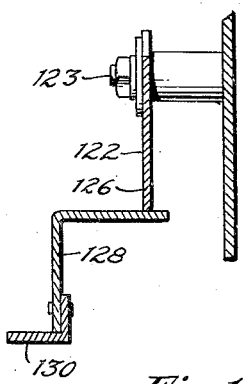
Fig. 14 is a sectional view looking in the direction of line 14—14 on Fig. 13.

The operation is as follows:

With the curtain open, as shown in Figs. 1 and 11, the voter enters the machine and closes the curtain either manually, by means of lever 80 of Fig. 15, or by means of motor M by turning switch shaft 114 from the position of Fig. 11 to the position of Fig. 12. In either event, pin 46 is disengaged from surface 48 of plate 52 and spring 42 pulls cam bars 28 and 90 to the left, or from the position of Fig. 1 to the position of Fig. 2. In this position notches 26 in cam bar 28 will be in registration with the followers 24 and therefore handle return members 14 or 15 can be moved upwardly by rotation of the voting keys. Since the handle return members are connected to the voting keys by butterflies B, the freedom of the handle return members to move upwardly means that the voting keys may now be turned to vote casting position. If cam bars 28 and 90 are moved by means of motor M, the parts of the switch will appear as shown in Fig. 12 in which pin 116 on disc 115 engages surface 124 and locks the switch so that it cannot be turned to curtain opening position until at least one vote has been cast.

Also, because in this position of the parts lug 106 engages the bottom of angle 110 at the top of locking bar 96, cam bar 90 cannot be moved to the right, or to curtain opening position and therefore the curtain cannot be opened manually.

Figure 13:
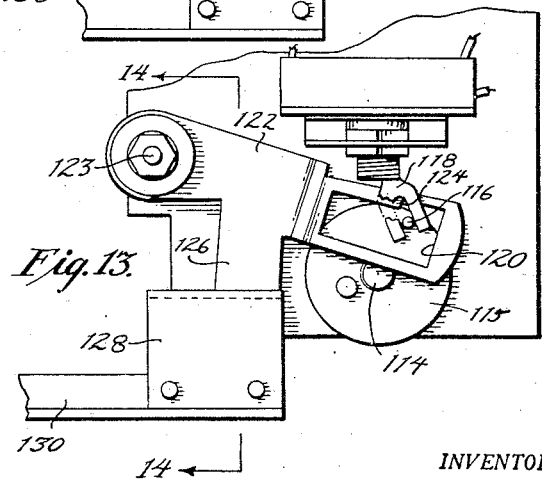
Fig. 13 is similar to Fig. 11 but shows the same parts as they appear in the position of Fig. 3.

It will be noted that if, before opening the curtain, the voter turns the voting key back to non-voting position, the corresponding handle return member will fall back to the position of Fig. 2 and it will be impossible to energize the motor, or manually to move cam bar 90, and, hence, the curtain cannot be open. However, if the voting key is left in vote casting position, bar 130 will be raised and, through lug 128, it will rotate locking plate 122 in counterclockwise direction to release pin 116 from surface 124, as shown in Fig. 13 and, simultaneously, pin 136 will rotate arm 108 in clockwise direction to disengage lug 106 from angle 110 to permit locking bar 96 to move downwardly. This, in turn, permits bar 90 to be moved to the right until pin 94 engages the lower portion of slot 92. In this position of the parts, either manually through lever 80, or electrically through motor M, cam bars 28 and 90 can now be moved to the right, or to the open curtain position of Fig. 1.

It will be noted that in the open curtain position of Fig. 1, pin 46 engages surface 48 and locks cam bar 28 in a position in which followers 24 ride on flats 27 and thus prevents raising of the handle return members and, hence, rotation of the voting keys and that, once the curtain is closed, the switch which controls the motor, and cam bar 90, and locking bar 96 are locked to prevent manual opening of the curtain unless at least one voting key is moved into, and left in, vote casting position.

I claim:

1. A voting machine including a plurality of vote casting elements, means mounting said elements for movement into a first, vote casting position and into a second nonvote-casting position, a plurality of individually mounted and individually vertically movable handle return members, means operatively connecting said handle return members to said vote casting elements, the connection being such that, when a vote casting element is moved to its first position, the corresponding handle return member is raised and that, when said handle return member moves down, it returns the corresponding vote casting element to its second position, a cam bar mounted for horizontal movement below the lower ends of said handle return members, there being spaced notches formed in the upper surface of said cam bar, followers carried by the lower ends of said handle return members, and means for moving said cam bar to a first position in which said followers register with said notches to permit upward movement of the handle return members and the movement of said vote casting elements to their first position and for moving said cam bar to a second position in which said notches do not register with said followers to prevent upward movement of said handle return members to prevent movement of said vote casting elements to their first position.

2. The structure recited in claim 1 in which said vote casting elements are arranged in columns and in which one handle return member is operatively connected to each of the vote casting elements in one of said columns.

3. The structure recited in claim 1 and means for counterbalancing each handle return member to facilitate raising said handle return member when the corresponding voting element is moved to its first position.

4. The structure recited in claim 3 in which said means is a tension spring connected to the handle return member and to the frame of the machine.

5. The structure recited in claim 1 and a curtain operating mechanism for moving said curtain into closing or into non-closing position, locking means for locking said cam bar in its second position, and release means operatively connected to said curtain operating mechanism and to said cam bar locking mechanism said release means being operative upon movement of said curtain to closing position to permit movement of said cam bar to its first position.

6. The structure recited in claim 5 in which said release means is manually operated.

7. The structure recited in claim 5 in which said release is motor operated.

8. The structure recited in claim 1 and additional means interlocking said curtain operating mechanism and said vote-casting elements to prevent opening of the curtain unless at least one vote casting has been moved into, and left in its first position, and release means interconnecting the vote casting elements with the curtain operating mechanism and operative upon movement of said vote casting element to said first position to permit opening of the curtain.

9. In a voting machine of the type which includes a vote registering mechanism, a plurality of vote casting elements each of which is movable to a first position to activate said voting mechanism and to a second position in which said vote casting element is re-set preparatory to further movement into said first position, vertically movable handle return members means operatively connecting each handle return member with at least one of said vote casting elements in such a manner that, when a vote casting element is moved to said first position, the corresponding handle return is moved upwardly and so that, when said handle return member moves downwardly, said vote casting element is moved to its second position, a curtain, actuating means for moving said curtain to closing position and to non-closing position, locking means for retaining said curtain in closing position, said locking means including a vertically movable locking bar, means operatively connecting said locking bar to said actuating means and operative to raise said locking bar, when said curtain is moved into its closing position, a latch above the upper end of said locking bar, means for normally biasing said latch into engagement with the upper end of said locking bar to retain the same in its upper position and thus prevent movement of the curtain to its non-closing position, and a release mechanism to disengage said latch from the upper end of said locking bar.

10. The structure recited in claim 9 in which said release mechanism including a horizontal bar, means pivotally mounting said horizontal bar for upward and lateral movement, said horizontal bar being so related to said latch and to the upper ends of said handle return members whereby, when any of said handle return members is raised by movement of any of said vote casting elements to its first position, said horizontal bar engages said latch and moves it out of engagement with the upper end of said locking bar to permit said bar to move downwardly and thus permit movement of said curtain to its closing position.

11. In a voting machine of the type which includes a vote registering mechanism, a plurality of vote casting elements each of which is operative to activate said voting mechanism, means for individually moving each of said elements to a first position in which it activates said vote registering mechanism and into a second position in which it is re-set preparatory to further movement into said first position, vertically movable handle return members, means operatively connecting each handle return member with at least one of said vote casting elements in such a manner that, when a vote casting element is moved to its first position, the corresponding handle return element is moved upwardly and so that, when said handle return member moves downwardly, said rotary member is moved to its second position, a curtain, actuating means for moving said curtain to closing position and to non-closing position, said actuating means including a motor, a switch movable to a first position in which it energizes the motor to move said curtain to closing position and to a second position in which said switch energizes the motor to move the curtain to non-closing position, locking means operable upon movement of said switch to said first position to lock said switch against movement to its second position, and a release mechanism operable upon movement of any of said vote casting elements to its first position to disengage said latch from said switch to permit movement of said switch to its second position.

12. The structure recited in claim 11 in which locking means includes a pivoted yoke, a pin carried by said switch and permanently engaging said yoke, a latch plate pivoted for movement into a lower position in which it engages said pin and prevents movement of said switch, and into an upper position in which it does not engage said pin to permit movement of said switch, and release means operable by movement of any of said vote casting elements to its first position to raise said latch plate and disengage it from said pin to permit further movement of said switch.

13. The structure recited in claim 12 in which said release mechanism includes a horizontal bar, means mounting said horizontal bar for upward movement into engagement with said latch plate, and means operable on movement of any of said vote casting element to its first position to raise said horizontal bar into engagement with said latch plate.

14. In a vote registering machine of the type which includes a vote registering mechanism and a number of activating members arranged in vertical columns and individually movable to a first position in which they activate said vote registering mechanism and to a second position in which said members are re-set preparatory to the commencement of another vote registering operation, a curtain, means for moving said curtain to a first position in which it closes the machine while a voter is voting and to a second position in which it does not close the machine to permit entry of a voter into the machine, a first slidable cam bar having a slot therein formed of an upper portion and a lower portion, a vertically movable locking bar, a roller carried by the lower end of said locking bar and engaging said slot, a second slidable cam bar having spaced notches in the upper surface thereof, a handle return member for each of said columns, means mounting each of said handle return members for upward movement with the movement of one of said activating members to said first position, a follower carried by the lower end of each of said handle return members, means for moving said cam bars to a first position in which said roller engages the high portion of the slot in said second cam bar to prevent downward movement of said locking bar and in which said followers register with said notches to permit upward movement of said handle return members, and to a second position in which said followers ride on the surface portions of said second cam bar and said roller engages the low portion of the slot in said first cam bar, means carried by said activating members and engageable with said handle return members to raise the latter when said activating members are moved to their first position.

15. The structure recited in claim 14 and a spring normally biasing said cam bars to said first position, a latch for preventing movement of said cam bar, and release means for releasing said catch.

16. The structure recited in claim 15 and a curtain operating means for opening or closing said curtain and means operatively connecting said release means with said operating means in such a manner that the closing of the curtain activates said release means.

References Cited in the file of this patent

UNITED STATES PATENTS

| | | |
|---|---|---|
| 2,251,254 | Shoup | July 29, 1941 |
| 2,277,857 | Shoup | Mar. 31, 1942 |
| 2,285,367 | Shoup | June 2, 1942 |